(12) United States Patent
Tong et al.

(10) Patent No.: US 10,768,434 B2
(45) Date of Patent: Sep. 8, 2020

(54) LASER BEAM COMBINING SYSTEM

(71) Applicant: Changchun Institute of Optics, Fine Mechanics and Physics, Chinese Academy of Sciences, Changchun, Jilin (CN)

(72) Inventors: Cunzhu Tong, Jilin (CN); Yufei Zhao, Jilin (CN); Fangyuan Sun, Jilin (CN); Shili Shu, Jilin (CN); Lijie Wang, Jilin (CN); Xin Zhang, Jilin (CN); Sicong Tian, Jilin (CN); Lijun Wang, Jilin (CN)

(73) Assignee: Changchun Institute of Optics, Fine Mechanics and Physics, Chinese Academy Of Sciences, Changchun (CN)

(*) Notice: Subject to any disclaimer, the term of this patent is extended or adjusted under 35 U.S.C. 154(b) by 83 days.

(21) Appl. No.: 16/258,059

(22) Filed: Jan. 25, 2019

(65) Prior Publication Data
US 2020/0103671 A1    Apr. 2, 2020

(51) Int. Cl.
G02B 27/28    (2006.01)
G02B 19/00    (2006.01)
G02B 27/14    (2006.01)

(52) U.S. Cl.
CPC ....... G02B 27/283 (2013.01); G02B 19/0052 (2013.01); G02B 27/14 (2013.01)

(58) Field of Classification Search
CPC ... G02B 27/283; G02B 19/0052; G02B 27/14
See application file for complete search history.

(56) References Cited

U.S. PATENT DOCUMENTS

2016/0131920 A1* 5/2016 Cook ................. G02B 27/283
                                                              359/489.07

* cited by examiner

*Primary Examiner* — Wen Huang
(74) *Attorney, Agent, or Firm* — Wayne & Ken, LLC; Tony Hom

(57) ABSTRACT

A laser beam combining system, including at least one beam combining unit. The beam combining unit includes reflective device, polarization conversion element and beam combining device. The reflective device includes two reflective surfaces configured to divide a high-polarization laser into a first beam and a second beam. The first beam is incident on the beam combining device. The polarization conversion element is provided on a propagation path of the second beam to convert the second beam into a light having a polarization direction perpendicular to an original polarization direction of the second beam. The converted light is guided to the beam combining device which is configured to combine the first beam and the converted light into one beam for outputting.

20 Claims, 2 Drawing Sheets

LASER BEAM COMBINING SYSTEM

CROSS-REFERENCE TO RELATED APPLICATIONS

This application claims the benefit of priority from Chinese Patent Application No. CN 201811160073.1, filed on Sep. 30, 2018. The content of the aforementioned application, including any intervening amendments thereto, is incorporated herein by reference in its entirety.

TECHNICAL FIELD

The present disclosure relates to a laser optical system, and more particularly to a laser beam combining system.

BACKGROUND

Lasers have very broad application prospects in civil and industrial fields. However, laser units usually have a low power or a low output brightness, which cannot meet the application requirements. The existing laser array is combined by a number of laser unit devices to increase the output power or brightness of laser and reduce the beam divergence. However, in the prior art, whether it is a laser unit device or a laser array, the beam quality of the laser output is not desirable, which cannot meet the application requirements.

SUMMARY

An object of the present disclosure is to provide a laser beam combining system used for improving beam quality and brightness under the condition that the output power of the laser is almost unchanged.

In order to achieve the above object, the present disclosure provides a following technical solution.

A laser beam combining system, including at least one beam combining unit. The beam combining unit includes a reflective device, a polarization conversion element and a beam combining device.

The reflective device includes two reflective surfaces configured to divide a high-polarization laser incident on the reflective device into a first beam and a second beam respectively reflected in different directions. The first beam is guided to enter the beam combining device. The polarization conversion element is provided on a propagation path of the second beam. The polarization conversion element is configured to convert the second beam into a light having a polarization direction perpendicular to an original polarization direction of the second beam. The converted light is guided to the beam combining device which is configured to combine the first beam and the converted light into one beam for outputting.

Preferably, the two reflective surfaces of the reflective device are perpendicular to each other. The high-polarization laser is incident on the two reflective surfaces at an incident angle of 45 degrees.

Preferably, a first reflector and a second reflector are arranged on a propagation path of the first beam. The first beam is incident on the first reflector at an incident angle of 45 degrees. The first beam reflected by the first reflector is incident on the second reflector at an incident angle of 45 degrees. Then the first beam reflected by the second reflector is incident on the beam combining device.

A third reflector is arranged on the propagation path of the second beam. The second beam is incident on the third reflector at an incident angle of 45 degrees. The polarization conversion element is arranged on the second propagation path between the third reflector and the beam combining device. The second beam converted by the polarization conversion element is guided to the beam combining device.

Preferably, the laser beam combining system includes a plurality of beam combining units arranged sequentially. A laser beam output by a beam combining device of a preceding beam combining unit is incident on two reflective surfaces of a reflective device of a subsequent beam combining unit.

Preferably, a polarization element for converting laser into a high-polarization laser is arranged on a propagation path of beam output by the beam combining device of the preceding combining unit. The converted beam is guided to the reflective device of the subsequent beam combining unit.

Preferably, the reflective devices are blade right-angle prisms of which two right-angle faces are both reflective surfaces.

Preferably, the polarization conversion elements are half wave plates.

Preferably, the beam combining devices are polarization beam combining prisms.

It can be seen from the above technical solution that the laser beam combining system provided by the present disclosure includes at least one beam combining unit. The beam combining unit includes a reflective device, a polarization conversion element and a beam combining device. The reflective device includes two reflective surfaces configured to divide a high-polarization laser incident on the reflective device into a first beam and a second beam respectively reflected in different directions. The first beam is incident on the beam combining device. The polarization conversion element is provided on a propagation path of the second beam. The polarization conversion element is configured to convert the second beam into a light having a polarization direction perpendicular to an original polarization direction of the second beam. The converted light is incident on the beam combining device which is configured to combine the first beam and the converted light into one beam for outputting.

The laser beam combining system of the present disclosure divides the high-polarization laser into two beams and changes the polarization state of one of the beams, then combines the two beams into one beam before outputting, so that beam quality and brightness are improved under the condition that the output power of laser is almost kept unchanged.

BRIEF DESCRIPTION OF THE DRAWINGS

In order to more clearly illustrate the embodiments of the present disclosure or the technical solutions in the prior art, the drawings will be briefly described below. Obviously, the drawings in the following description are only illustrative of embodiments of the present disclosure. It should be understood that for those of ordinary skills in the art, other drawings can be obtained according to the drawings without any creative work.

DETAILED DESCRIPTION OF EMBODIMENTS

The present disclosure will be further described below with reference to specific embodiments. The embodiments are only a part of the embodiments of the disclosure, and not all of the embodiments.

A laser beam combining system according to an embodiment of the present disclosure includes a beam combining unit. The beam combining unit includes a reflective device, a polarization conversion element and a beam combining device.

The reflective device includes two reflective surfaces configured to divide a high-polarization laser incident on the reflective device into a first beam and a second beam respectively reflected in different directions. The first beam is guided to enter the beam combining device. The polarization conversion element is provided on a propagation path of the second beam. The polarization conversion element is configured to convert the second beam into a light having a polarization direction perpendicular to an original polarization direction of the second beam. The converted light is guided to the beam combining device which is configured to combine the first beam and the converted light into one beam for outputting.

The high-polarization laser refers to a laser which has a larger proportion of a TE wave or a TM wave. The proportion of the TE wave or the TM wave is greater than a preset value, for example, the preset value is 60%.

The reflective device includes two reflective surfaces. The high-polarization laser is incident on the reflective surfaces of the reflective device. The two reflective surfaces divide the high-polarization laser into the first beam and the second beam respectively reflected in different directions. The first beam is guided to enter the beam combining device. The polarization conversion element is provided on a propagation path of the second beam. The polarization conversion element is configured to convert the second beam into a light having a polarization direction perpendicular to an original polarization direction of the second beam. The converted light is guided to the beam combining device which is configured to combine the first beam and the converted light into one beam for outputting.

The laser beam combining system of the present embodiment divides the high-polarization laser into two beams and changes the polarization state of one of the two beams, then combines the two beams into one beam before outputting, so that beam quality and brightness are improved under the condition that the output power of laser is almost kept unchanged.

The laser beam combining system will be described in detail below with reference to the drawings and specific embodiments.

Figure 1:
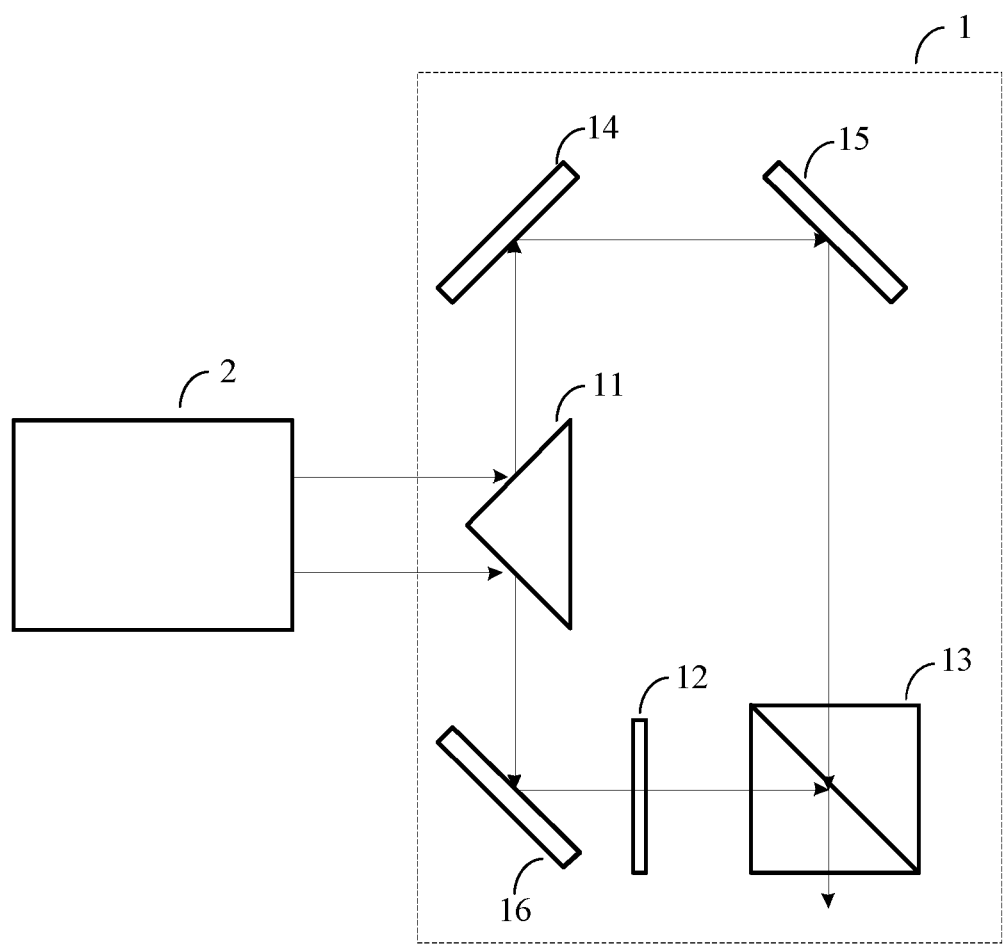
FIG. 1 is a schematic diagram of a laser beam combining system according to an embodiment.

Referring to FIG. 1, an embodiment of a laser beam combining system is illustrated. As shown in FIG. 1, the laser beam combining system includes a beam combining unit 1. The beam combining unit 1 includes a reflective device 11, a polarization conversion element 12 and a beam combining device 13.

A laser generating device 2 generates the high-polarization laser which is then incident on the reflective surfaces of the reflective device 11.

The reflective device 11 includes two reflective surfaces configured to divide the high-polarization laser incident on the reflective device 11 into the first beam and the second beam respectively reflected in different directions. The first beam is guided to enter the beam combining device 13. The polarization direction of the first beam does not change before the first beam is incident on the beam combining device 13. The polarization conversion element 12 is provided on a propagation path of the second beam. The polarization conversion element is configured to convert the second beam into a light having a polarization direction perpendicular to an original polarization direction of the second beam. The converted light is guided to the beam combining device 13 which is configured to combine the first beam and the converted light into one beam for outputting.

In this embodiment, the beam combining unit is able to increase the beam quality of the output laser two times over the original laser, and is able to increase the brightness of the output laser two times over the original laser brightness.

In a specific implementation, optionally, the two reflective surfaces of the reflective device 11 are perpendicular to each other. The high-polarization laser is incident on the two reflective surfaces of the reflective device 11 at an incident angle of 45 degrees. By adjusting the incident position at which the laser is incident on reflective device 11, reflective device 11 is able to divide the incident laser into two beams equally.

Further, optionally, as shown in FIG. 1, a first reflector 14 and a second reflector 15 are arranged on a first propagation path of the first beam. The first beam reflected by the reflective device 11 is incident on the first reflector 14 at an incident angle of 45 degrees. The first beam reflected by the first reflector 14 is incident on the second reflector 15 at an incident angle of 45 degrees. Then the first beam is reflected to the beam combining device 13 by the second reflector 15. A third reflector 16 is arranged on the propagation path of the second beam. The second beam reflected by the reflective device 11 is incident on the third reflector 16 at an incident angle of 45 degrees. The polarization conversion element 12 is arranged on the second propagation path between the third reflector 16 and the beam combining device 13. The second beam converted by the polarization conversion element 12 is guided to the beam combining device 13. The beam combining unit of the laser beam combining system adopts such an arrangement of propagation path to make the system compact. However, the present disclosure is not limited thereto. In other embodiments of the present laser beam combining system, the beam combining unit may also adopt other forms of propagation path, which are also within the scope of the present disclosure.

In practical applications, the propagation path design of the combining unit is not limited to the above, variations can be made based on the above descriptions, and such variations fall within the scope of the appended claims.

Figure 2:
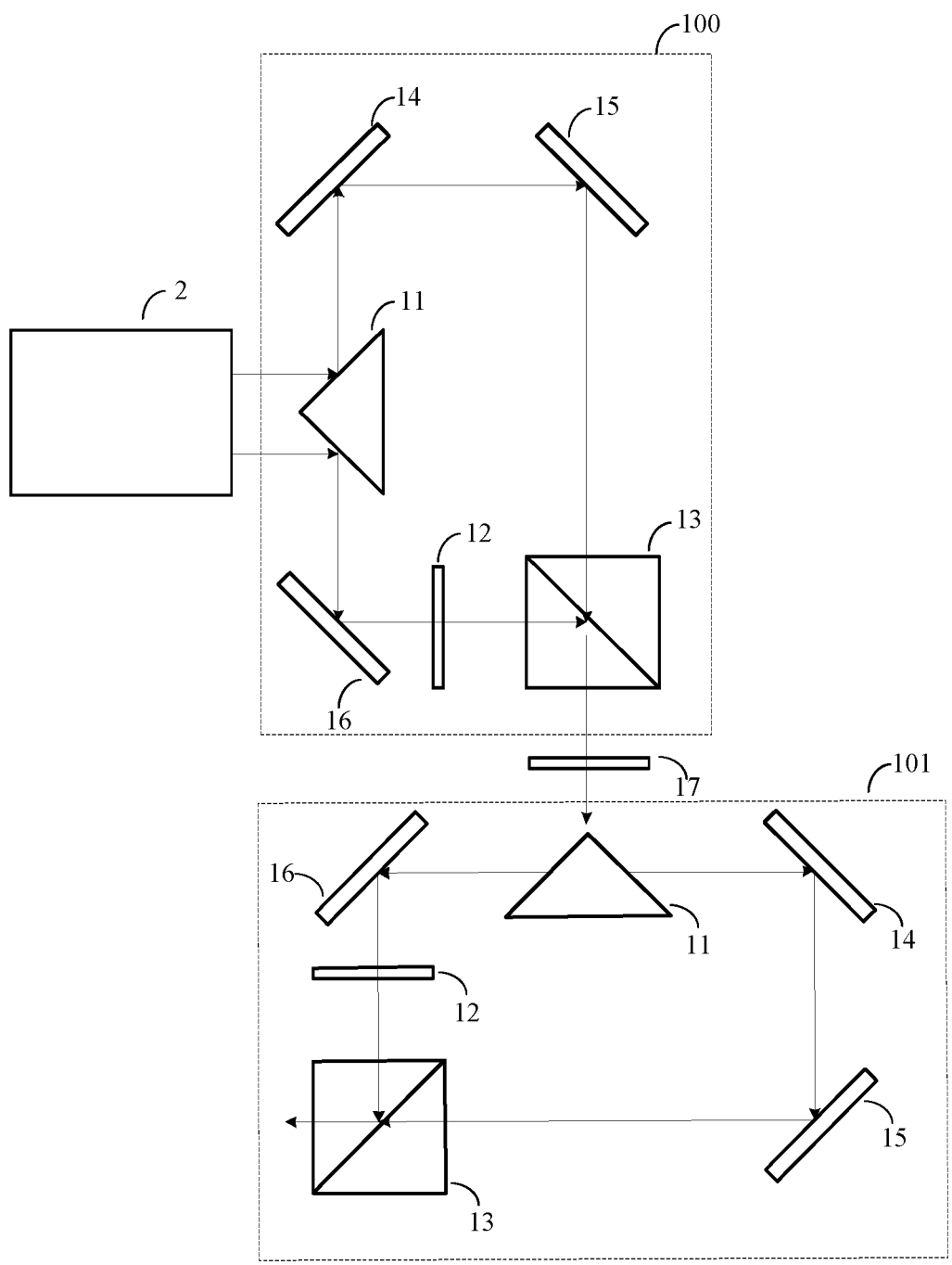
FIG. 2 is a schematic diagram of a laser beam combining system according to another embodiment.

In another embodiment, the laser beam combining system may include a plurality of combining units sequentially arranged. The laser beam output by the beam combining device of a preceding combining unit is incident on the two reflective surfaces of the reflective device of the subsequent combining unit. Exemplarily, referring to FIG. 2, FIG. 2 is a schematic diagram of a laser beam combining system according to the present embodiment. The laser beam combining system shown in the FIG. 2 is exemplified by an example including two combining units. As shown in FIG. 2, the present laser beam combining system includes a first combining unit 100 and a second combining unit 101. Each one of the two combining units includes a reflective device 11, a polarization converting element 12 and a beam combining device 13. The reflective device 11 includes two reflective surfaces configured to divide the high-polarization laser incident on the reflective device 11 into the first beam and the second beam respectively reflected in different directions. The first beam is guided to the beam combining device 13. The polarization conversion element 12 is provided on a propagation path of the second beam. The polarization conversion element is configured to convert the second beam into a light having a polarization direction perpendicular to an original polarization direction of the second beam. The converted light is guided to the beam combining device 13 which is configured to combine the first beam and the converted light into one beam for outputting.

The laser output by the beam combining device of the beam combining unit 100 is converted into a high-polarization laser beam by the action of the polarization conversion element 17, and further incident on the reflective device of the beam combining unit 101. The beam combining unit 101 divides the laser output by the beam combining unit 100 into two beams and changes the polarization state of one of the two beams, and then combines the two beams into one beam for outputting.

In the present embodiment, preferably, a polarization element for converting light into high-polarization light may be arranged on the propagation path of beam output by the beam combining device of the preceding beam combining unit. The converted beam is guided to the reflective device of the subsequent beam combining unit. This ensures that the laser incident on the subsequent beam combining unit has a high degree of polarization, so that the beam combining unit can effectively improve the beam quality and brightness for the incident laser.

In practical applications, the number of beam combining units can be set according to the application requirements, and the corresponding propagation path can be arranged. In addition, optical elements included in the combining unit and the propagation path design of the optical elements is not limited to those shown in FIG. 2.

The laser beam combining system of the present embodiment includes a plurality of combining units, each of which is capable of improving the beam quality and brightness of the incident laser. Therefore, beam quality and brightness of the final output laser can be greatly improved compared to the original incident laser.

In the above embodiments, the reflective device may adopt a blade right-angle prism of which two right-angle faces are both reflective surfaces. The right-angle surfaces of the right-angle prism are plated with a high-reflection film having high reflectance for the light of working waveband to improve light utilization efficiency and reduce light loss.

Alternatively, the polarization conversion element may be a half-wave plate that converts the polarization direction of polarized light by 90 degrees.

Optionally, the beam combining device may be a polarization beam combining prism. The first beam is incident on one surface of the polarization beam combining prism, transmitted through the polarization plane of the polarization beam combining prism. The second beam is incident on the other surface of the polarization beam combining prism, reflected by the polarization plane of the polarization beam combining prism, thereby the two beams are combined into one beam for outputting.

Alternatively, the high-polarization laser may be a laser predominantly including s-polarized laser or p-polarized laser.

It should be understood that for those of ordinary skills in the art, improvements or variations can be made based on the above descriptions, and such improvements and variations fall within the scope of the appended claims.

The embodiments are only illustrative of the present disclosure, and apparently the implementations are not limited by the above modes. The embodiments described herein and various modifications based on the ideas and technical solutions of the present disclosure fall within the scope of the present application.

What is claimed is:

1. A laser beam combining system, comprising:
at least one beam combining unit;
the beam combining unit comprises a reflective device, a polarization conversion element and a beam combining device;
the reflective device comprises two reflective surfaces configured to divide a high-polarization laser incident on the reflective device into a first beam and a second beam respectively reflected in different directions; the first beam is guided to enter the beam combining device and the polarization conversion element is provided on a propagation path of the second beam; the polarization conversion element is configured to convert the second beam into a light having a polarization direction perpendicular to an original polarization direction of the second beam; the converted light is guided to the beam combining device which is configured to combine the first beam and the converted light into one beam for outputting.

2. The laser beam combining system of claim 1, wherein the two reflective surfaces of the reflective device are perpendicular to each other; the high-polarization laser is incident on the two reflective surfaces at an incident angle of 45 degrees.

3. The laser beam combining system of claim 2, wherein a first reflector and a second reflector are arranged on a propagation path of the first beam; the first beam is incident on the first reflector at an incident angle of 45 degrees; the first beam reflected by the first reflector is incident on the second reflector at an incident angle of 45 degrees; then the first beam reflected by the second reflector is incident on the beam combining device;
a third reflector is arranged on the propagation path of the second beam; the second beam is incident on the third reflector at an incident angle of 45 degrees; the polarization conversion element is arranged on the second propagation path between the third reflector and the beam combining device; the second beam converted by the polarization conversion element is guided to the beam combining device.

4. The laser beam combining system of claim 1, wherein the system comprises a plurality of beam combining units arranged sequentially; a laser beam output by a beam combining device of a preceding beam combining unit is incident on two reflective surfaces of a reflective device of a subsequent beam combining unit.

5. The laser beam combining system of claim 4, wherein a polarization element for converting laser into a high-polarization laser is arranged on a propagation path of beam output by the beam combining device of the preceding combining unit; the converted beam is guided to the reflective device of the subsequent beam combining unit.

6. The laser beam combining system of claim 1, wherein the reflective devices are blade right-angle prisms of which two right-angle faces are both reflective surfaces.

7. The laser beam combining system of claim 2, wherein the reflective devices are blade right-angle prisms of which two right-angle faces are both reflective surfaces.

8. The laser beam combining system of claim 3, wherein the reflective devices are blade right-angle prisms of which two right-angle faces are both reflective surfaces.

9. The laser beam combining system of claim 4, wherein the reflective devices are blade right-angle prisms of which two right-angle faces are both reflective surfaces.

10. The laser beam combining system of claim 5, wherein the reflective devices are blade right-angle prisms of which two right-angle faces are both reflective surfaces.

11. The laser beam combining system of claim 1, wherein the polarization conversion elements are half wave plates.

12. The laser beam combining system of claim 2, wherein the polarization conversion elements are half wave plates.

13. The laser beam combining system of claim 3, wherein the polarization conversion elements are half wave plates.

14. The laser beam combining system of claim 4, wherein the polarization conversion elements are half wave plates.

15. The laser beam combining system of claim 5, wherein the polarization conversion elements are half wave plates.

16. The laser beam combining system of claim 1, wherein the beam combining devices are polarization beam combining prisms.

17. The laser beam combining system of claim 2, wherein the beam combining devices are polarization beam combining prisms.

18. The laser beam combining system of claim 3, wherein the beam combining devices are polarization beam combining prisms.

19. The laser beam combining system of claim 4, wherein the beam combining devices are polarization beam combining prisms.

20. The laser beam combining system of claim 5, wherein the beam combining devices are polarization beam combining prisms.

* * * * *